(Model.)
T. N. BABB & A. G. KEISLING.
WATER ELEVATOR AND CARRIER.
No. 250,624. Patented Dec. 6, 1881.
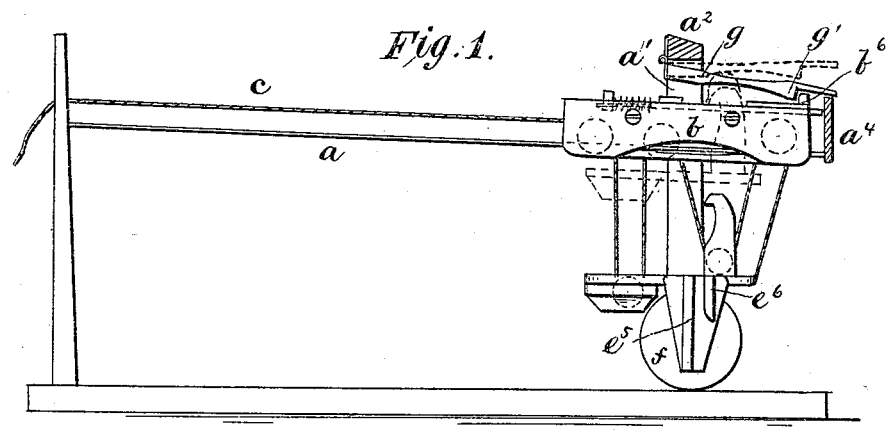
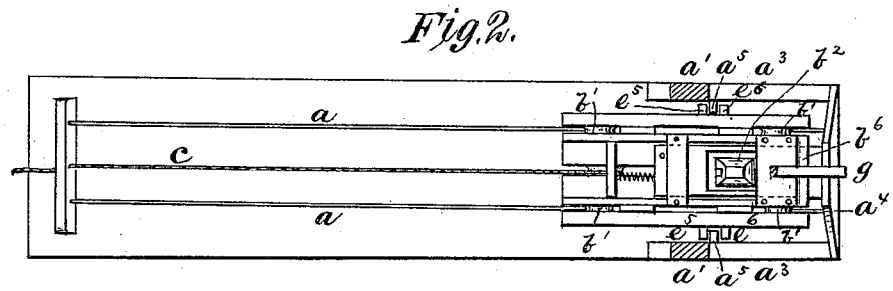
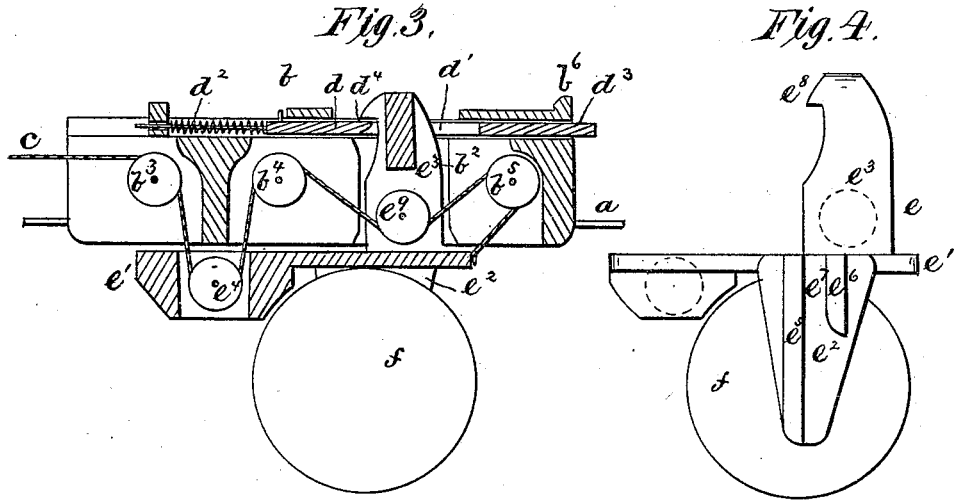
Witnesses
Geo. A. Digges,
P. B. Turpin
Inventor:
Thomas N. Babb
Alexander G. Keisling
By R. S. & A. P. Lacey attys
N. PETERS. Photo-Lithographer, Washington, D. C.

UNITED STATES PATENT OFFICE.

THOMAS N. BABB AND ALEXANDER G. KEISLING, OF NETTLE CARRIER, TENN.; SAID BABB ASSIGNOR TO JOHN KEISLING, OF SAME PLACE.

WATER ELEVATOR AND CARRIER.

SPECIFICATION forming part of Letters Patent No. 250,624, dated December 6, 1881.

Application filed September 13, 1881. (Model.)

*To all whom it may concern:*

Be it known that we, THOMAS N. BABB and ALEXANDER G. KEISLING, citizens of the United States, residing at Nettle Carrier, in the county of Overton and State of Tennessee, have invented certain new and useful Improvements in Water Elevators and Carriers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish improvements in water carriers or elevators employed in drawing water from wells or springs located at a distance from the house or place where the water is used.

It consists in a car running on elevated rods or ways and provided with pulleys and ropes, a bucket-carrier, an automatic spring-catch for holding the bucket-carrier, and other mechanism, all arranged to operate as hereinafter fully explained.

In the drawings, Figure 1 is a side elevation, Fig. 2 is a plan, and Fig. 3 is a vertical longitudinal section, of a device constructed according to our invention; and Fig. 4 shows a side elevation of the bucket-carrier detached from the car.

$a\ a$ are the rods or ways, which are supported above the ground in any well-known manner.

A suitable frame is erected over the well or spring of water from which water is to be drawn. This frame consists of two vertical posts, $a'\ a'$, held together at their upper ends by a cross-bar, $a^2$, and the horizontal arms $a^3$ $a^3$, the outer ends of which are connected together by the head-board $a^4$. The ends of the rods $a\ a$ are made fast in the head-board.

$a^5\ a^5$ are guides fixed to and projecting inward from the inner sides of the posts $a$, and they have their lower ends placed down in the water, while their upper ends extend to a point nearly level with the rods $a$. The guides $a^5$ serve to carry the bucket-frame vertically downward to the water.

$b$ is the car which carries the water-bucket and its supporting-carriage. At the sides of the car there are journaled the anti-friction rollers $b'\ b'$, which run on the rods $a$. A vertical opening, $b^2$, is formed, through which the catch-bar of the bucket-carriage will readily pass.

$b^3\ b^4\ b^5$ are pulleys journaled on a central longitudinal line, and over which the draft-cord $c$ is passed. The pulleys $b^3\ b^4$ are placed near the forward end of the car and the pulley $b^5$ at the rear end. The opening $b^2$ is midway between the pulleys $b^4\ b^5$.

$d$ is an automatic slide moving in a guideway, and held in place by suitable flanges or cross-cleats on the top of the car. It is provided with an opening, $d'$, which corresponds to the opening $b^2$ in the car, and it is arranged so that it slides partially over the said opening $b^2$. It is held in place by the spring $d^2$. Its outer end, $d^3$, projects beyond the end of the car next the head-board $a^4$, and strikes against the latter when the car and bucket are moved into the frame over the well or spring. The slide is formed so that the edge or lip $d^4$ on that side of opening $d'$ next the draft end of the car will project partially over the opening $b^2$ and form a catch to hold the bucket-carriage. The spring $d^2$ acts in such manner as to hold the lip $d^4$ constantly projected over the opening $b^2$, except when the slide is thrown back by the contact of the projecting end $d^3$ with the head-board $a^4$.

$e$ is the carriage to which the bucket $f$ is attached. It consists of a substantial frame composed of a horizontal plate, $e'$, the pendent arms $e^2\ e^2$ for holding the bucket $f$, and the vertical coupler or hook-bar $e^3$.

$e^4$ is a pulley journaled in the forward end of the plate $e'$, and is arranged in the same vertical plane with the pulleys in the car $b$.

$e^5\ e^6$ are two cleats fixed in a vertical position on the sides of the pendent arms $e^2$, and arranged to form guide-slots $e^7$, which slide over the guide-bars $a^5$ and cause the bucket-carriage to drop vertically into the water.

The coupler-head $e^3$ has a hook, $e^8$, formed on its upper end, which catches over the lip $d^4$ of the catch-bar $d$, when the bucket-carriage is raised from the water.

$e^9$ is a pulley journaled centrally in the coupler-head, and arranged to be in line with the pulleys in the car and forward end of plate $e'$.

$g$ is a lock-bar. It has one end hinged to the top bar, $a^2$, while its other end extends over the top of the head-board $a^4$, and it is provided with a pendent shoulder, $g'$, which catches behind a flange, $b^6$, on and locks the car in the vertical frame while the bucket is being let down to be filled with water. When the bucket-carriage is raised from the water the coupler-head $e^3$ passes upward through the opening $b^2$, strikes against, lifts, and disengages the lock-bar from the flange $b^6$ and releases the car.

The cord $c$ passes over the top of the pulley $b^3$, under the pulley $e^4$, over pulley $b^4$, under pulley $e^9$, and over pulley $b^5$, and has its end made fast to the end of the plate $e'$ of the bucket-carriage. It will be seen that the portion of the cord between the pulleys $b^3$ $b^4$ forms a loop which supports the forward end of the bucket-carriage, while that portion of the cord between the pulleys $b^4$ $b^5$ makes a loop to support the rear end of said bucket-carriage. One end of the rope or cord being made fast to the bucket-carriage and the other end held taut by the draft mechanism, and being carried around the pulleys, as described, a means is provided which gives a steady movement to the bucket when being lowered into or raised from the water and when being drawn to the dwelling.

The operation of the device is easily understood. The car runs down the ways $a$ and enters the framing over the water. The end $d^3$ of the catch-bar strikes against the head-board $a^4$, and is forced back and from under the hook on the coupler-head $e^3$. The coupler-head being released, the bucket-carriage drops vertically downward, guided by the cleats $a^5$ and $e^5$ $e^6$. The bucket fills with water. The cord $c$ is then drawn upon, the bucket-carriage is raised, the lock $g$ disengaged, and the coupler-head caught by the catch-bar $d$. The hauling in of the cord at the house draws the car and bucket up the ways $a$.

Having thus described our invention, what we claim, and desire to secure by Letters Patent, is—

1. The combination of the car $b$, the pulleys $b^3$ $b^4$ $b^5$, journaled in the car, the bucket-carriage $e$, having a pulley, $e^4$, journaled in its forward end and the pulley $e^9$ at or near its rear end, and the rope or cord $c$, passed over the pulleys $b^3$, $b^4$, and $b^5$ and under the pulleys $e^4$ and $e^9$, and having its end made fast to the rear end of the bucket-carriage, substantially as set forth.

2. The combination, substantially as hereinbefore set forth, of the carriage $b$, having a shoulder, $b^6$, the automatic catch $d$, held in guides on the carriage $b$, and its end $d^3$ projecting outward therefrom and supported by a suitable spring, the bucket-car provided with a vertical coupler-head, $e^3$, the locking-bar $g$, pivoted on a stationary bar, $a^3$, and the bumper $a^4$, as set forth.

3. The combination, with the car $b$, having a flange or shoulder, $b^6$, of the locking-bar $g$, having one end hinged to the cross-bar $a^2$ and its other end resting on the head-board $a^4$, and provided with a shoulder, $g'$, and the coupler-head $e^3$ on the bucket-carriage, substantially as set forth.

In testimony whereof we affix our signatures, in presence of two witnesses, on this 2d day of September, 1881.

THOMAS N. BABB.
ALEXANDER G. KEISLING.

Witnesses:
R. S. BEETS,
ANDREW RICE.